United States Patent [19]

Leduc et al.

[11] Patent Number: 5,208,856
[45] Date of Patent: May 4, 1993

[54] SCRAMBLING AND UNSCRAMBLING METHOD FOR COMPOSITE VIDEO SIGNALS AND IMPLEMENTING DEVICE

[75] Inventors: Michel Leduc, Boersch; Joël Hamon, Lipsheim; Jean-Claude Guillon, Gerstheim; Francis Renard, Ostwald; Eric Diehl, Neudorf, all of France

[73] Assignee: Laboratoire Europeen de Recherches Electroniques Avancees, Courvevoie, France

[21] Appl. No.: 811,906

[22] Filed: Dec. 23, 1991

Related U.S. Application Data

[63] Continuation of Ser. No. 566,347, Aug. 22, 1990, abandoned.

[30] Foreign Application Priority Data

Dec. 23, 1988 [FR] France .................................. 8817092

[51] Int. Cl.$^5$ ............................................ H04N 7/167
[52] U.S. Cl. ....................................... 380/14; 380/16; 380/17; 380/20
[58] Field of Search ......................... 380/14, 16, 17, 20

[56] References Cited

U.S. PATENT DOCUMENTS

| | | |
|---|---|---|
| 4,388,643 | 6/1983 | Aminetzah . |
| 4,484,027 | 11/1984 | Lee et al. . |
| 4,723,282 | 2/1988 | Marie et al. ........................... 380/14 |
| 4,748,668 | 5/1988 | Shamir et al. ......................... 380/28 |
| 4,751,732 | 6/1988 | Kamitake ............................... 380/20 |
| 4,916,737 | 4/1990 | Chomet et al. ........................ 380/20 |

FOREIGN PATENT DOCUMENTS

| | | |
|---|---|---|
| 0132007 | 1/1985 | European Pat. Off. . |
| 2151886 | 7/1985 | United Kingdom . |
| 8400656 | 2/1984 | World Int. Prop. O. . |

*Primary Examiner*—Stephen C. Buczinski
*Attorney, Agent, or Firm*—Oblon, Spivak, McClelland, Maier & Neustadt

[57] ABSTRACT

The method of the invention consists, during the transmission of composite video signals, in the inclusion therein of series of access messages (ECM1, ECM2) and, during the unscrambling, carried out using a chip card reader whose chip card comprises encoded digital data, in using an interactive method of identification of a digital signature.

12 Claims, 4 Drawing Sheets

SCRAMBLING AND UNSCRAMBLING METHOD FOR COMPOSITE VIDEO SIGNALS AND IMPLEMENTING DEVICE

This application is a continuation of application Ser. No. 07/566,347, filed on 8/22/90, now abandoned.

BACKGROUND OF THE INVENTION

1. Field of the Invention

The present invention relates to a scrambling and unscrambling method for composite video signals, and to an implementing device.

1. Discussion of the Background

The methods currently used for scrambling video signals, particularly in the field of pay television, have the feature of, on the one hand, transmitting access messages, valid for all receivers, simultaneously with the video signals and, on the other hand, of periodically transmitting specific authorization messages to each receiver in a different way, for example by post or by telephone. Because of their method of transmission, the transmission periodicity of these authorization messages can only be relatively long, for example one month. A period as long as this can easily be taken advantage of by "pirates" who thus have sufficient time to discover the unscrambling key and to take advantage of it. Furthermore, this known method does not allow the paying of a subscription for only a portion of the programmes broadcast on a pay television channel if one is not interested in the totality of these programmes.

SUMMARY OF THE INVENTION

The subject of the present invention is a scrambling and unscrambling method for composite video signals whose unscrambling key is practically impossible to discover without very expensive means, and which allows all known subscription methods, including the so-called "pay per view" type of subscription (freely selected programmes).

The subject of the present invention is also a device for implementing this method.

The scrambling and unscrambling method for composite video signals according to the invention, according to which the scrambling is carried out by a line permutation and is controlled by a pseudo-random sequence, the unscrambling being controlled by a pseudo-random sequence identical to and synchronized with the one used for scrambling, the pseudo-random scrambling sequence depending on a control word (CW) whose encoded value is incorporated in the composite video signal, is characterized in that there is included in the unused lines, of at least a portion of the transmitted images, encoded digital data packets corresponding to different access messages, and in that on reception these access message data are combined in a confidential manner with data supplied to the receiver of the video signals, and in that, from this combination, a control word is produced for a pseudo-random generator controlling a digital video unscrambling circuit.

According to one aspect of the method of the invention, the data supplied to the receiver of the video signals must be those contained in a microprocessor card.

According to another aspect of the method of the invention, the said combination is carried out using a combinative method whose security of protection from unauthorized decoding increases as a function of the number of times that it is used, in particular an interactive method of identification of a digital signature, advantageously a method using the Shamir algorithm.

The device for scrambling and unscrambling composite video signals according to the invention is used in an image transmission system comprising a transmitter and receivers, the scrambling section of the system comprising, in the transmitter, a digital scrambling circuit connected to a pseudo-random sequence generator controlled by a control unit, and the unscrambling section comprising, in each receiver, a decoder with a digital unscrambling circuit connected to a pseudo-random sequence generator controlled by a control unit, and, according to the invention, the control unit of the transmitter includes means producing access messages, and the control unit of each decoder is connected to a code checker which is itself connected to a microprocessor card reader.

According to an advantageous characteristic of the invention, the interface, in each decoder, between the control unit and the code checker, is a parallel interface.

BRIEF DESCRIPTION OF THE DRAWINGS

The present invention will be better understood on reading the detailed description of an embodiment, taken by way of non-limiting example and illustrated by the appended drawings, in which.

DESCRIPTION OF THE PREFERRED EMBODIMENTS

Figure 1:
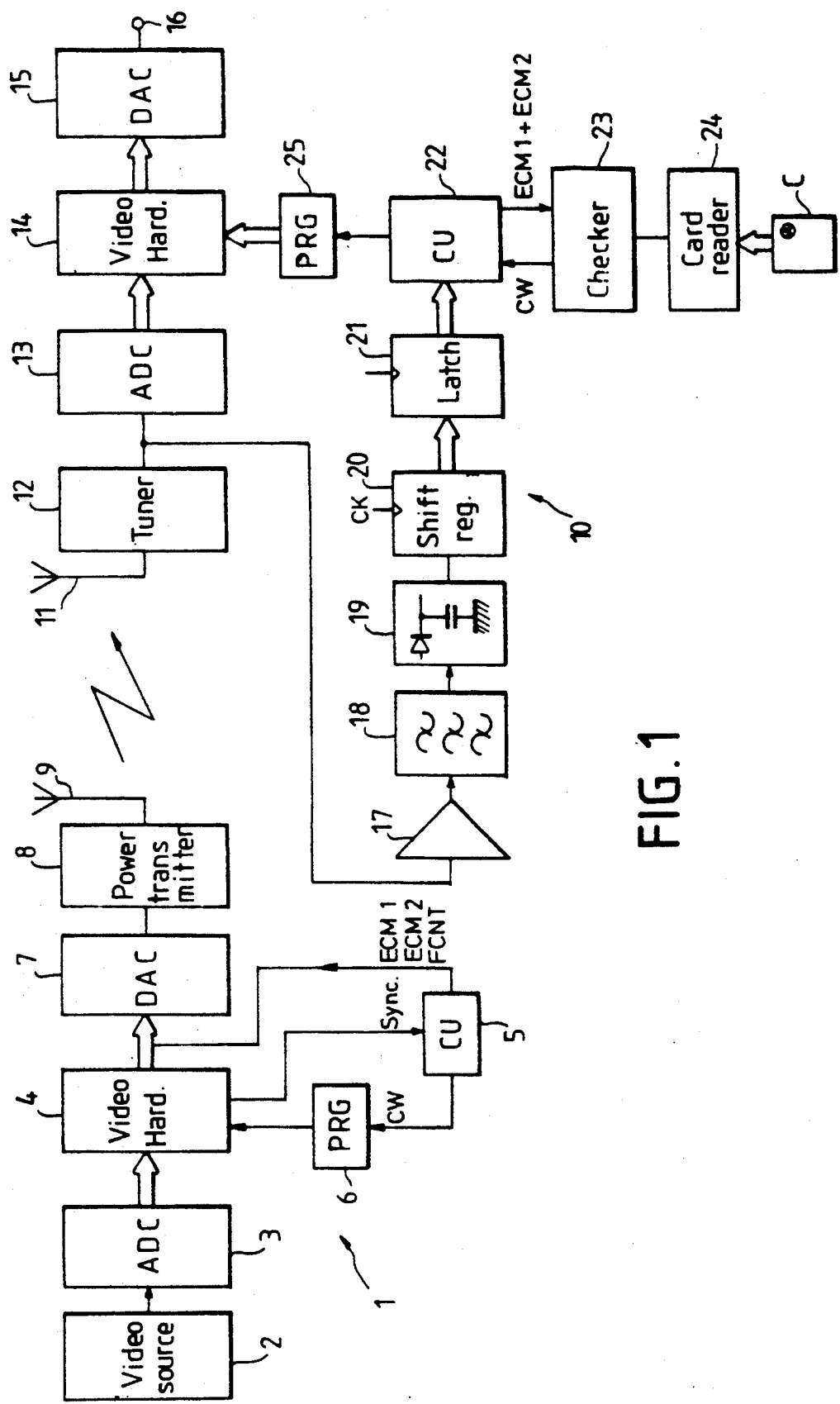
FIG. 1 is a simplified block diagram of a transmitter of pay television programmes scrambled according to the method of the invention and of one of the receivers receiving these programmes and including a corresponding unscrambling device.

The system for the broadcasting of pay television programmes described below relates to a European transmission standard having 25 complete images per second, but it can, of course, be applied to any other standard by adding modifications to it which are obvious to those skilled in the art. Furthermore, the transmissions can, of course, be scrambled only for certain programmes and can be transmitted in clear for the other programmes.

The transmitter and the television receiver 1 are described only briefly below as most of their circuits are well known per se. The only things included in the invention are, in the transmitter, the circuits for producing access message packets, and the circuits for inserting these data packets in certain of the lines of the images to be scrambled and, in the receiver, the unscrambling circuits.

The transmitter 1 comprises a source 2 of images supplying composite video signals. Its output is connected via an analog-digital converter 3 to an intermediate video scrambler circuit 4 of a type which is known per se. This circuit 4 is controlled by a control unit 5 via a pseudo-random sequence generator 6, and it sends to this central unit synchronization signals corresponding to the video signals. The circuit 4 is connected via a digital-analog converter 7 to a power transmitter 8 whose transmitting antenna is referenced 9.

In FIG. 1, there has been shown the block diagram of that one of the television receivers which is able to receive the transmissions from the transmitter 1 and provided with unscrambling circuits according to the invention. This receiver is referenced 10. The receiver 10 comprises a receiving antenna 11 connected to a tuner 12 followed by an analog-digital converter 13, a digital video unscrambling circuit 14, and a digital-/analog convertor 15 at the output 16 of which the unscrambled video signals are taken.

The output of the circuit 12 is also connected, via an amplifier 17, a filter 18 and a peak value detector 19, to the serial input of a shift register 20. The parallel outputs of the register 20 are connected, via a buffer register 21, to the data inputs of a microprocessor computer 22, for example a microprocessor of the EF6805 type.

The computer 22 is connected in a bidirectional manner to a security code checker 23. This checker 23 is connected to a "chip cards" (sic) (microprocessor cards (sic) also known as a "smart card") reader 24. The computer 22 is also connected to a pseudo-random sequence generator 25 which is itself connected to the circuit 14.

In the transmitter 1, the video signals coming from the source 2 and digitized by the converter 3 are scrambled in the circuit 4 under the control of pseudo-random sequences of signals produced by the generator 6. Each of the successive binary numbers of a sequence appearing in synchronism with the successive lines of the video signal determines a break point in the corresponding line, this break point being able to be located at any position in the line. The scrambling consists in permutating the sections of the line situated on either side of this break point. This scrambling method, called "scrambling by line permutation", being well known per se, will not be described in greater detail.

The sequences of the pseudo-random generator 6 have a relatively short cycle: 2.56, 5.12 or 10.24 seconds. The 2.56 s cycle is particularly advantageous for limiting the lock-on time of the decoder on switching on. The different values of sequences mentioned above are selected dynamically in the transmitter. These sequences are controlled by the control unit 5 as a function of an access to the programme message, here called the ECM (Entitlement Checking Message), common to all the receivers. In known pay television systems, the authorization messages are communicated to subscribers by post, by modem or by any other telecommunications means. The access messages can therefore be modified only at relatively long time intervals (usually a few weeks), which allows "pirates" to discover them (it is estimated that these messages can be discovered in 1 to 2 days) well before their next modification.

According to the present invention, the control unit 5 of the transmitter inserts access messages in the composite video (at the input of the converter 7). This central processing unit 5 (sic) provides, among other things, an image counter function (FCNT). This counter is incremented by unity every other frame, that is to say at each complete image (every 40 ms for a 50 Hz interlaced frame standard), using the image sync pulses of the video signal sent by the circuit 4. In the present case, this counter has a maximum count state of 255 (8-bit counter). After having reached this maximum state, the counter returns to zero, and allows the synchronization of control words (CW) whose encoded version is the said access message. This control word can, for example, have a length of 60 bits and it is chosen in a random manner. This control word determines a new cycle of the generator 6.

Figure 2:
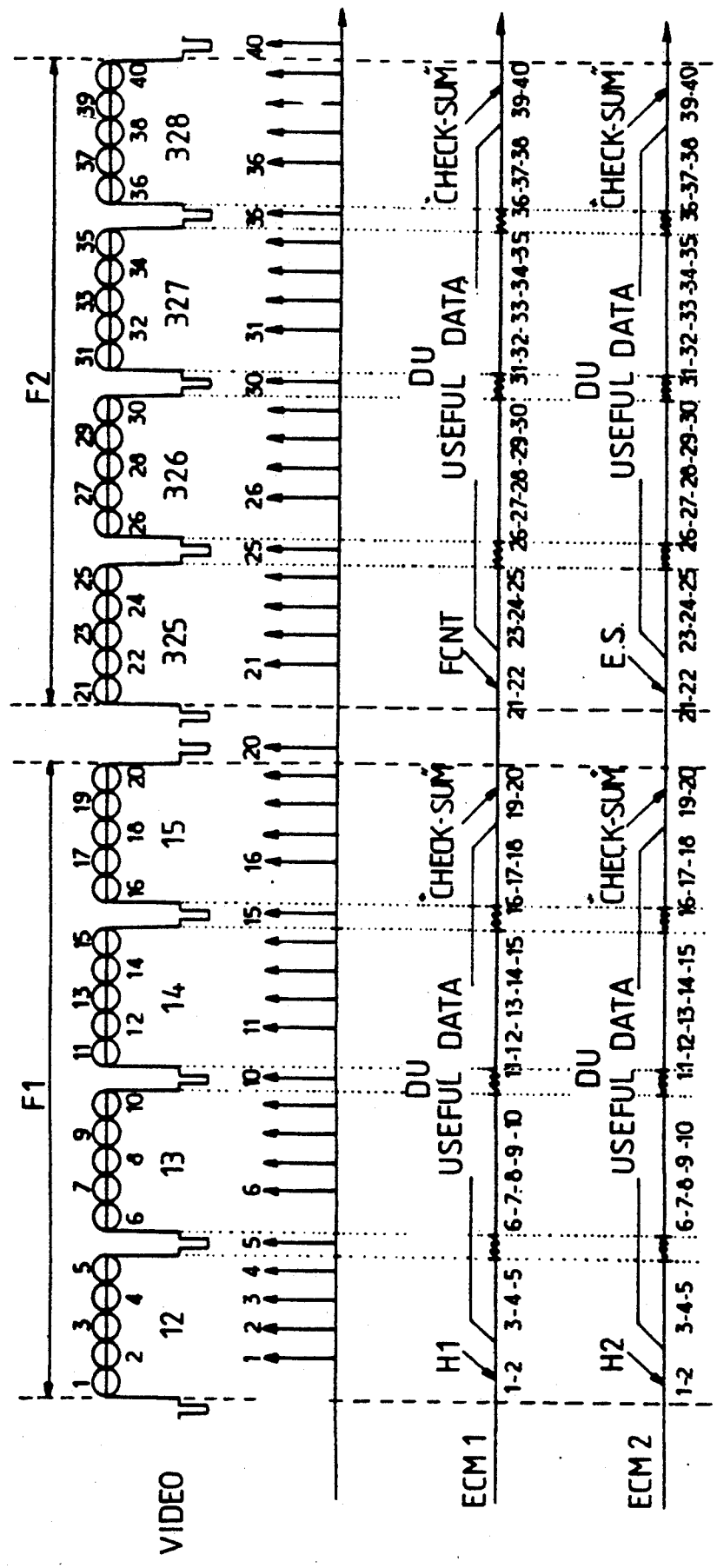
FIG. 2 is a timing diagram of signals showing the arrangement of the various data necessary for the unscrambling with respect to certain of the first lines of the images transmitted by the transmitter in FIG. 1.

Furthermore, the control unit 5 sends to the circuit 7, at specific instants, the following data: the state of the counter (FCNT), access message headers (H1 and H2), data concerning the state of the transmission system (scrambled or not scrambled, free access or pay access, message data rate), and check data ("check num" or CRC, for example). The central unit sends these data during the transmission of lines which are not used by the image. According to the CCETT 625-line standard, there are lines which are not used by the visible image before the 23rd and after the 310th line. In the present example, four of these lines not used by the image are used for the encoding, for example the lines 12 to 15 for the field F1 and the lines 325 to 328 for the field F2 as shown in FIG. 2. At each of these lines, during the useful duration of the line, the central processing unit sends five bytes of encoding data, that is 40 bits per line and 20 bytes for each field of four lines. The binary zeros correspond to the black level and the "1"'s correspond to the white level. Thus at the start of each complete image (every 40 ms in the abovementioned example), a data packet (of 40 bytes) is incorporated in the composite video signal transmitted by the transmitter 1.

Two different types of data packets are transmitted: ECM1 and ECM2. An example of the structure of each of these types of packets has been shown in FIG. 2. Advantageously, these data packets are encoded, for example, in 8-4 Hamming code, in order to be better protected from transmission interference. According to a variant of the invention, the different bytes of each packet can be interlaced within that packet in order to improve immunity from interference. They are all, of course, correspondingly de-interlaced in each decoder.

In the timing diagram of FIG. 2, the different packets ECM1 and ECM2 include an identification header H1 and H2 respectively. These headers permit the discrimination of the ECM1 packets from the ECM2 packets with the following relationship:

$$(Q_H + Q_L)_{ECM1} = (Q_H + Q_L)_{ECM2} = F_{hexa}$$

in which relationship QH (sic) and $Q_L$ are quartets of the header.

For example if $H1 = A5_{hexa}$ for ECM1, it is necessary to have $H2 = 5A_{hexa}$ for ECM2, and it is checked that $A + 5 = F_{hexa}$.

The data packets ECM1 and ECM2 then comprise, for the field F1, sixteen bytes DU of useful data for the checker, two "check sum" bytes and then, for the field F2: two bytes for FCNT, sixteen bytes DU of useful data for the checker, and two "check sum" bytes. For ECM2, the FCNT data are replaced by the system status data ES.

Figure 3:
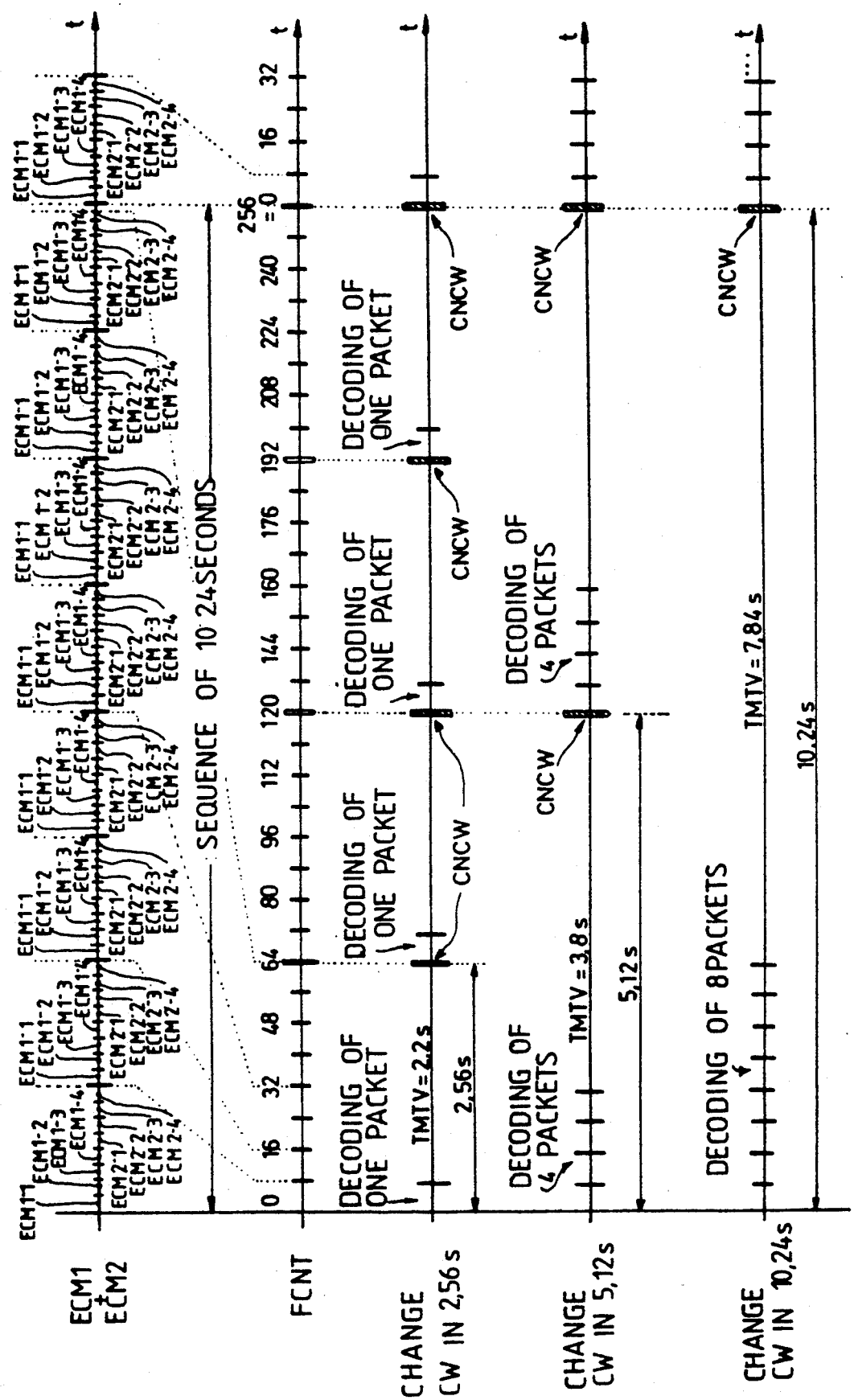
FIG. 3 is a timing diagram showing the structure of the data packets transmitted by the transmitter of FIG. 1 over a period of 10.24 seconds.

FIG. 3 shows, on the second line, a counting cycle of the image counter FCNT from 0 to 255, that is to say for a time period of 10.24 seconds. During this time, the central unit 5 continually produces the values ECM1 and ECM2 alternated and repeated in the way shown in the first line of FIG. 3. For one cycle of FCNT, the central processing unit 5 can produce eight packets each comprising four times ECM1 and then four times ECM2 per packet. In this FIG. 3, the abbreviations CNCW and TMTV respectively signify "loading a new control word CW" and "maximum processing time of the checker".

During this period of FCNT, it is possible to change the code word CW four times, or twice or once, that is to say according to a period of 2.56 s, 5.12 s or 0.24 s respectively, as shown in the 3rd, 4th and 5th lines of FIG. 3.

In the first case (2.56 s period) the central processing unit 5 sends a minimum of one decoding packet in every 2.56 s period, which leaves the checker 23 a maximum time of 2.2 s for carrying out its processing before the loading of the next code word. In the second case, the central processing unit 5 sends a minimum of four decoding packets in each period of 5.12 s, which leaves the checker a maximum processing time of 3.8 s. In the third case, the central processing unit 5 sends a minimum of 8 decoding packets in each 10.24 s period, which leaves the checker a maximum processing time of 7.84 s. These different values of periods are supplied by the data of the E.S. byte.

In each receiver, such as the receiver 10 shown in FIG. 1, the composite signal taken from the output of the circuit 12 is amplified, filtered, detected (in 17, 18 and 19 respectively) and the successive data bytes thus detected are transmitted to the central processing unit via the buffer 21. The filling of the shift register 20 is carried out at the rate of the clock signals (CK) produced by the central processing unit 22.

The data arriving at the central processing unit 22 from the register 21 are, of course: ECM1 and ECM2. When the central processing unit 22 recognises ECM1 or ECM2 packets (from their header H1 or H2), it extracts from ECM1 the value FCNT which is used by it for correcting, as necessary, the count state of its image counter (subroutines of this central processing unit). The central processing unit 22 uses a free wheel for producing FCNT and locks onto the bytes 21 and 22 of the line 325 giving the true current value of FCNT, which is advantageously encoded in Hamming code.

The zero state of the image counter (which occurs every 40 ms) determines the processing phases of the packets by the central unit and the loading of the pseudo-random generator. The active windows of the pseudo-random generator occur during the useful lines of the image, that is to say for a 625-line (CCETT (sic) standard lines 23 to 310 and 336 to 623 (for the 1st and 2nd frames respectively of each image). The central processing unit 22 produces, at the moment of each return to zero of FCNT, a waiting loop of approximately 20 lines duration in order to be capable of receiving the data packets which it receives starting from line 12. The data reception windows extend from line 12 to line 15 and from line 325 to line 328. Outside of these windows and almost up to the next zero of FCNT, the central processing unit is dedicated to processing the data packets.

The dialogue between the processor 22 and the checker 23 is carried out using parallel transmission (over 1 byte) in order to minimize the processing time of the messages and to be able to perform it in real time.

Figure 4:
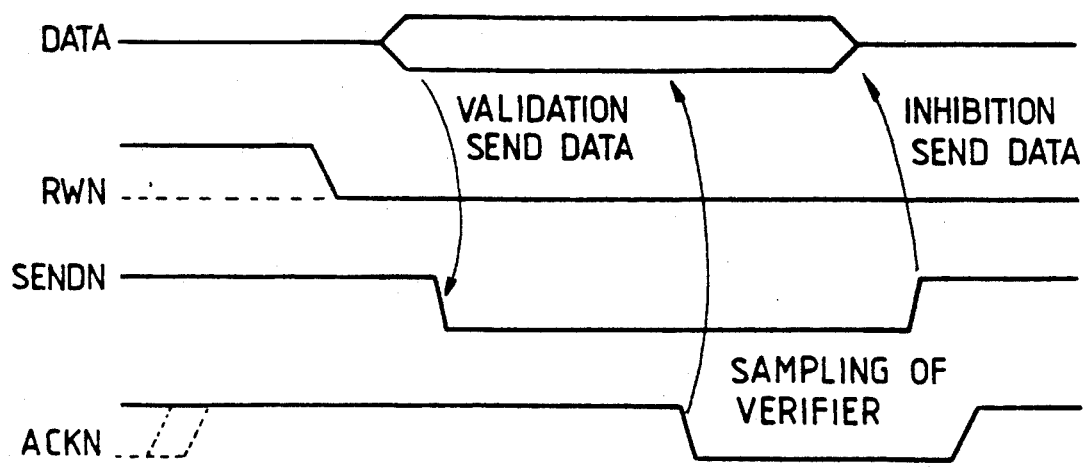
FIGS. 4 and 5 are timing diagrams of signals exchanged in a decoder according to the invention.

In addition to the useful data ("DATA") ECM1 and ECM2 (32 bytes in total in one example), the processor 22 sends the following data to the checker (see FIG. 4): RWN (write/read) and SENDN (data loading) and receives from it ACKN (acknowledgement of reception).

Figure 5:
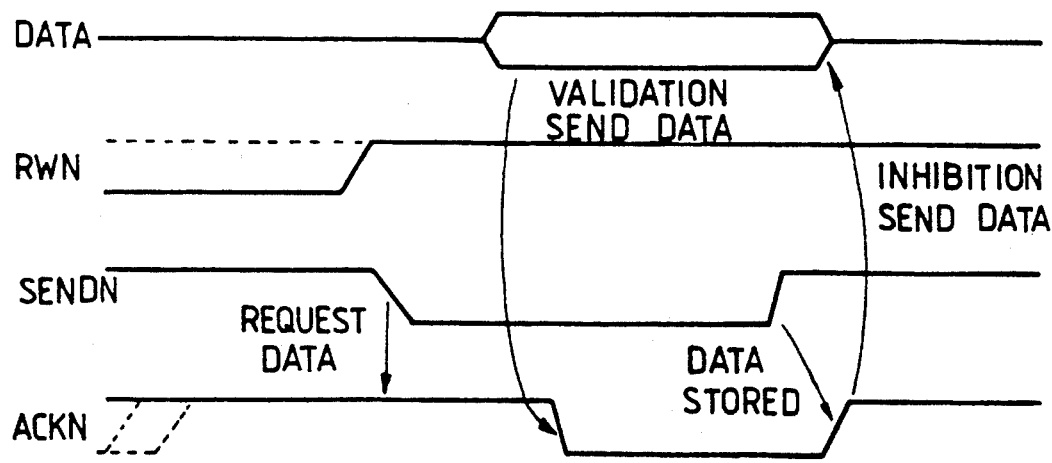

The checker 23 sends the following data to the processor 22 (see FIG. 5), in addition to the control word CW over 8 bytes: RWN (write/read) and SENDN (data loading) and receives from it ACKN (acknowledgement of reception).

The checker 23 combines the data ECM1 and ECM2 with the data contained in the microprocessor card C inserted by the user in the reader 24. The function of the checker is to check the validity of the processing carried out inside the microprocessor card while retaining confidentiality in the data exchanges between this checker and the processor 22 on the one hand and between the checker and the reader 24 on the other hand.

The said combination can be based on an interactive identification of digital signature principle. The dialogue between the microprocessor card and the checker 23 must allow it to be checked that the decoder actually possesses the sought secret value but it must do this without actually revealing it. The basic principle consists in saying that, if the result of a product of factorization of large numbers is known at the level of each decoder, it is no less difficult to know these two numbers. Consequently, if $\sqrt{x} \pmod{n}$ is transmitted, this being able to be expressed by a series of products of factors with specific coefficients, it thus becomes more difficult to find this number x. In order to be able to unscramble the transmissions, the decoder <u>must prove</u> its knowledge of the secret value $Y = \sqrt{x} \pmod{n}$ without actually revealing it. Thus, the reader chooses a random number R and then computes $T = R2 \pmod{x}$ and sends T to the checker which randomly chooses between 1: requesting the reader to supply R such that $\sqrt{T} = R$ and checks that $R2 = T \pmod{n}$ 2: requesting the reader to supply $VTX = RY \pmod{n}$ $$\sqrt{Tx}/\sqrt{T} = \sqrt{x}$$

It can therefore be seen that the dialogue between the checker and the reader can be summarized as transfers of numbers and that the computation of the square roots or squares is carried out according to a given time and using specific coefficients. Thus the messages between the microprocessor card and the decoder which are accessible to a defrauder do not allow him to decode the message within a time which is compatible with the functioning of the system thus defined without an extraordinary computing power using considerable means, which makes any fraud disadvantageous because it is too expensive.

We claim:

1. A scrambling and unscrambling method for composite video signals, comprising:
   scrambling said video signals by a line permutation controlled by a first pseudo-random sequence using a variable control word;
   inserting, in predetermined unused lines of at least a portion of transmitted images included in said composite video signals, encoded digital data packets corresponding to different access messages, said digital data packets including said control word;
   transmitting said scrambled composite video signals including said access messages;
   receiving said transmitted scrambled composite video signal;
   extracting said access messages from said received composite video signal;

combining said access messages in a confidential manner with data supplied to a receiver of the scrambled composite video signals;

producing said control word for a pseudo-random sequence generator; and controlling unscrambling of said scrambled composite video signal using a second pseudo-random sequence based upon said control word, said second pseudo-random sequence being identical to and synchronized with said first pseudo-random sequence.

2. Method according to claim 1, characterized in that the data supplied to the receiver of the video signals must be those contained in a microprocessor card (C).

3. Method according to claim 1 or 2, characterized in that the combination is carried out using a combinative method whose security of protection from unauthorized decoding increases as a function of the number of times that it is used.

4. Method according to claim 3, characterized in that the combinative method is an interactive method of identification of a digital signature.

5. Method according to claim 3, characterized in that the combinative method uses the Shamir algorithm.

6. Method according to claim 4, characterized in that the combinative method uses the Shamir algorithm.

7. Method according to claim 1, further comprising:

incrementally inserting, in said predetermined unused lines, count data from an initial count state to a maximum count state; and changing said control word a predetermined number of times during a period from said start count state to said maximum count state.

8. Device for scrambling and unscrambling composite video signals for an image transmission system, comprising:

a transmitter and at least one receiver;

a scrambling section comprising, in the transmitter, a digital scrambling circuit connected to a first pseudo-random sequence generator controlled by a first control unit; and an unscrambling section comprising, in said at least one receiver, a decoder comprising a digital unscrambling circuit connected to a second pseudo-random sequence generator controlled by a second control unit;

the first control unit of the transmitter comprising means for producing access messages to be inserted in predetermined unused lines in a scrambled composite video signal, including a control word for controlling said first pseudo-random sequence generator; and the second variable control unit of each decoder being connected to a code checker connected to a microprocessor card reader which produces said control word from said scrambled composite video signal for controlling unscrambling of said scrambled composite video signal.

9. Device according to claim 8, characterized in that the interface, in each decoder, between the control unit and the code checker, is a parallel interface.

10. Device according to claim 8, wherein said first control unit comprises:

counter means, incremented every other frame of said composite video signal, for outputting count data from an initial count state to a maximum count state;

means for inserting said count data into said scrambled composite video signal; and means for changing said control word inserted in said scrambled composite video signal a predetermined number of times between said initial count state and said maximum count state of said counter means.

11. A decoder for unscrambling composition video signals, comprising:

means for receiving a scrambled video signal and for converting said scrambled video signal into a digital video signal;

message means for receiving said scrambled video signal from said receiving means and for producing access messages using said scrambled video signal;

a card reader for reading data from a microprocessor card inserted in said reader;

checker means for checking validity of processing carried out inside said microprocessor card;

processing means, for receiving said access messages from said message means and receiving a variable control word from said checker means, said checker means producing said control word in response to said access messages output from said processing means while maintaining confidentiality in data exchanges between said processing means and said checker means, and for producing a pseudo-random number seed;

a pseudo-random binary sequencer for generating a pseudo-random number sequence based upon said seed output by said processing means;

a digital video memory for unscrambling said digital video signal based upon said pseudo-random number sequence output by said pseudo-random binary sequencer; and a digital-to-analog converter for converting said unscrambled digital video signal into an analog output video signal.

12. A decoder as recited in claim 11, further comprising:

means for extracting count data inserted into said scrambling video signal;

wherein said processing means processes said access messages using said count data extracted by said extracting means.

* * * * *

UNITED STATES PATENT AND TRADEMARK OFFICE
CERTIFICATE OF CORRECTION

PATENT NO. : 5,208,856
DATED : May 4, 1993
INVENTOR(S) : Michel Leduc et al.

It is certified that error appears in the above-identified patent and that said Letters Patent is hereby corrected as shown below:

On the title page, Item [30] and [73],

The PCT Information has been omitted from the Foreign Application Priority Data, should read:

--Dec. 23, 1988   [FR]   France...............8817092

Dec. 8, 1989   [PCT]   PCT.................PCT/FR89/00636--

The assignee's city is spelled incorrectly, should read:

--Courbevoie--

Signed and Sealed this

Fourth Day of January, 1994

*Attest:*

BRUCE LEHMAN

*Attesting Officer*   Commissioner of Patents and Trademarks